(12) United States Patent
Fujisaki et al.

(10) Patent No.: US 6,818,195 B2
(45) Date of Patent: Nov. 16, 2004

(54) COMBUSTION CATALYST AND PROCESS FOR REMOVING ORGANIC COMPOUNDS

(75) Inventors: Hiroyuki Fujisaki, Tokuyama (JP); Wataru Kobayashi, Shinnanyo (JP); Masao Nakano, Hikari (JP)

(73) Assignee: Tosoh Corporation, Shinnanyo (JP)

( * ) Notice: Subject to any disclaimer, the term of this patent is extended or adjusted under 35 U.S.C. 154(b) by 125 days.

(21) Appl. No.: 09/777,853

(22) Filed: Feb. 7, 2001

(65) Prior Publication Data

US 2001/0016185 A1 Aug. 23, 2001

(30) Foreign Application Priority Data

Feb. 7, 2000 (JP) .......................................... 2000-034331

(51) Int. Cl.$^7$ .............................................. B01D 53/70
(52) U.S. Cl. ........................ 423/245.3; 502/64; 502/66; 502/325; 502/326
(58) Field of Search .......................... 423/245.3, 240 R, 423/240 S, 628; 502/64, 66, 325, 326

(56) References Cited

U.S. PATENT DOCUMENTS

| | | | | |
|---|---|---|---|---|
| 3,656,915 A | * | 4/1972 | Tourtellote ................... | 422/171 |
| 3,899,444 A | * | 8/1975 | Stephens ..................... | 502/241 |
| 4,059,676 A | | 11/1977 | Yang et al. .................. | 423/240 |
| 4,141,859 A | * | 2/1979 | Plank et al. .................. | 502/66 |
| 4,257,885 A | * | 3/1981 | Grose et al. .................. | 502/60 |
| 4,983,366 A | * | 1/1991 | Deller et al. ............. | 423/240 R |
| 5,108,717 A | | 4/1992 | Deller et al. ................. | 422/171 |
| 5,125,231 A | * | 6/1992 | Patil et al. ..................... | 60/274 |
| 5,244,852 A | * | 9/1993 | Lachman et al. ............. | 502/66 |
| 5,451,388 A | | 9/1995 | Chen et al. ............. | 423/240 R |
| 5,466,421 A | | 11/1995 | Deller et al. ................. | 422/171 |
| 5,780,102 A | * | 7/1998 | Mizukami et al. .......... | 427/266 |
| 5,928,981 A | * | 7/1999 | Leyrer et al. ................. | 502/64 |
| 6,074,973 A | * | 6/2000 | Lampert et al. ............... | 502/60 |
| 6,403,048 B1 | | 6/2002 | Kobayashi et al. | |
| 2002/0155051 A1 | | 10/2002 | Kobayashi et al. | |

FOREIGN PATENT DOCUMENTS

| | | | |
|---|---|---|---|
| EP | 0 516 850 | 12/1992 | ........... B01D/53/36 |
| EP | 0 842 700 | 5/1998 | ............ B01J/37/02 |
| JP | 4-284849 | 10/1992 | ............ B01J/29/06 |
| JP | 8-038896 | 2/1996 | ............ B01J/23/42 |

\* cited by examiner

*Primary Examiner*—Stanley S. Silverman
*Assistant Examiner*—Maribel Medina
(74) *Attorney, Agent, or Firm*—Oblon, Spivak, McClelland, Maier & Neustadt, P.C.

(57) ABSTRACT

A combustion catalyst for removing organic compounds from a gas stream containing the same and a process for removing organic compounds from the gas stream using the catalyst are disclosed. The combustion catalyst comprises a first catalyst comprising a metal oxide containing at least one of the elements of the platinum group, and a second catalyst comprising a mixture of zeolite with a metal oxide containing at least one of the elements of the platinum group, in a manner such that the organic compounds are contacted first with the first catalyst and then with the second catalyst, whereby the organic compounds can be efficiently removed at a low temperature.

23 Claims, No Drawings

COMBUSTION CATALYST AND PROCESS FOR REMOVING ORGANIC COMPOUNDS

BACKGROUND OF THE INVENTION (1) Field of the Invention

This invention relates to a combustion catalyst for removing organic compounds from a gas stream containing the same, and a process for removing organic compounds from the gas stream using the catalyst. More particularly, it relates to such a combustion catalyst as are effective for removing organic compounds diluted in a gas stream, and a process for removing such organic compounds from the gas stream using the catalyst.

(2) Description of the Related Art

A wide range of synthetic organic compounds are processed and produced as intermediates and products in chemical plants, with a concomitant leakage or accidental discharge into environment. Frequently, exhaust gases from waste incinerator plants contain organic compounds. Many such organic compounds are harmful to both the environment and health. Consequently, there is a need to establish an effective emission control technique. Particularly, there is a need to develop effective and practical techniques for controlling emission of volatile organic compounds or halogen-containing organic compounds, There have been proposed many methods for removing organic compounds from gas streams, including adsorption, direct combustion and catalytic combustion methods. Though the adsorption method may work effectively when it is employed for treating a gas stream having a high content of organic compounds. Removal efficiency may deteriorate when it is used for treating a gas stream containing dilute organics. In the case of the direct combustion method, a temperature as high as 800° C. or higher is required, which is not economically viable. Furthermore, the direct combustion method suffers from the problem that nitrogen oxides are generated which could result in a source of secondary pollution.

As a catalytic combustion method, for example, Japanese Patent Public Disclosure (KOKAI) (hereinafter referred to "JP-A") No. HEI-4-250825 describes a method for treating a gas stream containing halogen-containing organic compounds wherein said gas stream is brought into contact with an acidic zeolite. In the method, the halogen-containing organic compounds are treated by contacting the gas stream with an acidic zeolite or an acidic zeolite that is loaded and/or exchanged with at least one metal belonging to the second to sixth periods of the Periodic Table of Elements.

JP-A HEI-4-284849 discloses a catalyst decomposing 1,2-dichloroethane and a method for treating a waste gas stream with such a catalyst. In the disclosed method, the 1,2-dichloroethane decomposing catalyst comprises an acidic zeolite or an acidic zeolite which has been loaded and/or ion-exchanged with a transition metal or metals.

JP-A HEI-8-38896 discloses a catalyst for decomposing chlorinated volatile organic compounds. According to the disclosure, the catalyst is capable of decomposing chlorinated volatile organic compounds in the presence of steam and oxygen. The catalyst comprises at least one selected from platinum, palladium and ruthenium as a primary catalytically active substance which is supported on a carrier consisting essentially of zirconia, said catalyst supporting further a co-catalyst comprising boron oxide. In the catalyst, the proportion of the primary catalytically active substance is, as calculated as metal, 0.1 to 5% by weight on the basis of the total weight of catalyst, and the proportion of the co-catalyst is, as calculated as $B_2O_3$, 2 to 5% by weight on the same basis.

Japanese Patent Public Disclosure (KOKOKU) (hereinafter referred to "JP-B") No. HEI-6-87950 describes a process for catalytically reacting a waste gas stream containing hydrocarbons, halogenated hydrocarbons and carbon monoxide, and an apparatus for effecting such a process. The reference particularly describes a process for catalytically contacting a waste gas stream from vinyl chloride synthesis, wherein said gas stream is passed through a first zone including a catalyst for oxidately decomposing the noxious compounds at 300–800° C., and then, through a second zone including a catalyst for oxidatively combusting the noxious compounds. The first zone catalyst comprises, as a catalytically active substance, aluminum oxide, silicon dioxide and/or a zeolite, which may contain optionally 0.1 to 20% by weight of one or more oxides of elements Ba, Cu, Cr and Ni. The second zone catalyst comprises, as a catalytically active ingredient, platinum and/or palladium, or a combination of platinum and rhodium.

As mentioned above, prior art references JP-A HEI-4-250825 and JP-A HEI 4-284849 disclose methods for treating a gas stream contaminated with halogen-containing organic compounds, in which the gas stream is brought into contact with either an acidic zeolite or acidic zeolite supporting and/or exchanged with at least one metal belonging to the second to six periods of the Periodic Table of Elements. However, these catalysts are not satisfactory in their gas cleaning performance in that the methods can produce by-products including halogen-containing compounds other than those that are envisaged to be removed through the methods.

On the other hand, the combustion methods disclosed in the above-mentioned references JP-A HEI-8-38896 and JP-B HEI-6-87950 require a considerably raised operation temperature exceeding about 500° C.

In view of the foregoing, primary objects of the present invention are to provide an improved combustion catalyst capable of efficiently removing harmful or noxious organic compounds present in a gas stream without yielding undesirable by-products, and to provide a process for removing the organic compounds from the gas stream using the combustion catalyst.

The other objects and advantages of the invention will become clear from the description given below.

SUMMARY OF THE INVENTION

In accordance with the present invention, there is provided a combustion catalyst for removing organic compounds, which comprises a first catalyst comprising a metal oxide containing at least one of the elements of the platinum group, and a second catalyst comprising a mixture of zeolite with a metal oxide containing at least one of the elements of the platinum group; said first catalyst and said second catalyst being arranged in a manner such that organic compounds to be removed are contacted first with the first catalyst and then with the second catalyst.

In accordance with the present invention, there is further provided a process for removing organic compounds by catalytic combustion, said process comprising the step of contacting organic compounds to be removed, with the above-mentioned combustion catalyst of the invention In a manner such that the organic compounds are contacted first with the first catalyst of the combustion catalyst and then with the second catalyst of the combustion catalyst.

DESCRIPTION OF THE PREFERRED EMBODIMENTS

The combustion catalyst of the invention comprises a first catalyst and a second catalyst which are arranged in a manner such that organic compounds to be removed are contacted first with the first catalyst and then with the second catalyst. The first catalyst comprises a metal oxide containing at least one of the elements of the platinum group, and the second catalyst comprises a mixture of zeolite with a metal oxide containing at least one of the elements of the platinum group.

Zeolites are crystalline aluminosilicates that are generally represented by the chemical composition:

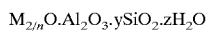

$$M_{2/n}O \cdot Al_2O_3 \cdot ySiO_2 \cdot zH_2O$$

where n is the valence of cation M, y is a number of 2 or greater, and z is a number of at least 0 or greater. There are many kinds of known natural and synthetic zeolites.

Zeolites suitable for use in the present invention are not restricted to any specific one. In order to attain a high durability or a long service time, however, it is preferred to employ zeolites having a $SiO_2/Al_2O_3$ molar ratio of 10 or greater in the above-defined composition. As typical examples, there can be mentioned ferrierite, Y, erionite, mordenite, ZSM-5, ZSM-11 and beta. These natural and synthetic zeolites may be used as they are, or they may be ion-exchanged or calcined before being used in the invention, Preferably, the zeolite to be used in the invention Is ion-exchanged. In this case, though the cation species used in ion exchange is not limited to any specific species, preferably species from IA and/or IIA group, and more preferably from IIA group, is used for ion-exchanging process. A particularly preferred cation is a calcium ion. Two or more cationic species may be used in combination.

The metal oxide used in the invention includes oxides of a metal selected from Groups IVA, VA, VIA, VIIA, VIII, IB, IIB, IIIB, IVB and VB of the Periodic Table. Amongst them, alumina, titanium oxide, zirconium oxide and silica are preferred. These metal oxides may be used either alone or in combination.

It is known that alumina is porous. Generally, the size of pores in alumina materials is not uniform and varies widely in size. Thus, the radii of pores of an alumina material fall in a range of distribution. Where an alumina is employed as an metal oxide material in the first aspect of the present invention, preferably the alumina has such a pore size distribution that, where "a" represents a pore radius in Å at the maximum of the pore size distribution curve, the accumulated pore volume of pores having radii in the range of (a−25) Å to (a+25) Å is at least 65% of the total volume of all the pores. This is because it has been found that an alumina material showing such pore size characteristics enables efficient removal of organic compounds to be achieved easily by strongly promoting combustion thereof. Though the mechanism by which combustion is promoted significantly as a consequence of the stated pore size characteristics has not yet been made clear, it has been found that the performance of combustion catalyst is largely affected by a pore size "distribution" rather than the pore size itself, "radius".

Further, where alumina is employed as a metal oxide material in the first aspect of the present invention, it is preferable that the alumina material has a content of rare earth elements of not greater than 1% by weight, preferably not greater than 500 p.p.m. and more preferably it contains rare earth elements In an amount less than a detectable level.

The "rare earth elements" referred to herein include elements of atomic numbers 57–71 and scandium and yttrium. Usually the content of rare earth elements in alumina can be determined by analyzing the elements using ICP (inductively coupled plasma) emission spectroscopy. A content of not greater than 1% by weight of rare earth elements in the alumina material will enable a highly effective combustion of organic compounds to be achieved easily, Elements other than the rare earth elements may be present in the alumina material without adversely affecting the performance of the catalyst.

The "element of the platinum group" as mentioned herein include six elements that are ruthenium, osmium, rhodium, iridium, palladium and platinum. The most preferred is platinum.

The process for loading the element of the platinum group on the metal oxide Is not limited to any specific one. For example, an impregnation technique or ion-exchanging technique may be used for introducing the element of the platinum group into the metal oxide. Where, for example, platinum is to be introduced into a metal oxide material by the ion-exchanging technique, the metal oxide material is added into a solution containing a platinum ion and the resulting mixture is stirred at about 20–100° C. for a period of about 5 minutes to 100 hours. In the case where an alumina material is to be impregnated with platinum, for example, the alumina material may be added into a solution containing a platinum ion and thereafter the solvent. e.g., water, may be removed from the mixture. Examples of the platinum salts which may be used include the ammine complex salt, the dinitrodiamine complex salt, the chloride salt and the like.

Though the content of the element of the platinum group contained In the metal oxide is not restricted to any specific range, preferably the content ranges from 0.0005 to 10.0% by weight, more preferably 0.01 to 8.0% by weight, on the basis of the total weight of the metal oxide and the element of the platinum group, in order to obtain an enhanced performance catalyst.

In the combustion catalyst of the invention, the ratio of the first catalyst comprising a metal oxide containing at least one of the elements of the platinum group to the second catalyst comprising a mixture of zeolite with a metal oxide containing at least one of the elements of the platinum group is not restricted to any specific range, but preferably the ratio ranges from 1:20 to 2:1 by weight to obtain a particularly satisfactory catalyst.

The ratio of zeolite to a metal oxide containing at least one of the elements of the platinum group in the mixture of the second catalyst also Is not restricted to any specific range, but preferably the ratio ranges from 20:1 to 1:20 by weight to obtain a particularly satisfactory catalyst.

In the second catalyst of the combustion catalyst, the mixture of zeolite with a metal oxide containing at least one of the elements of the platinum group is preferably uniform. A uniform mixture of finely divided powder of zeolite and finely divided powder of the metal oxide is especially preferable. The materials may be combined together in powder form or slurry form so as to provide eventually a homogeneous mixture. As an alternative method, It is preferable to prepare a mixture by mixing a raw material oxide and a zeolite, and thereafter loading at least element of the platinum group on the metal oxide in the resulting mixture.

The metal oxide containing at least one of the elements of the platinum group in the first catalyst, and the mixture of a zeolite with a metal oxide containing at least one of the elements of the platinum group in the second catalyst may be pre-treated, for example, by drying, dehydration or calcination before they are supplied to any intended combustion process.

The combustion catalysts for removing organic compounds according to the invention may be supplied in any form, such as powder, pellets, honeycomb structure or other appropriate geometric configuration. For example, a binder, such as alumina sol, silica sol or a clay, may be added to the catalyst to be formed into any desired shape or configuration. Alternatively, water may be added to the catalyst powder to prepare a slurry which is applied onto, for example, the surface of a honeycomb refractory substrate made of alumina, magnesia or cordierite.

The first catalyst and second catalyst of the combustion catalyst are arranged upstream and downstream, respectively, namely, in a manner such that a stream of gas flow containing organic compounds is contacted first with the first catalyst and then with the second catalyst. The first catalyst and the second catalyst may be either adjacent to or spaced apart from each other. In the latter case, the distance between the first catalyst and the second catalyst can be voluntarily determined.

The organic compounds to be removed by the invention are hydrocarbon compounds which may contain hydrogen, halogen and oxygen in the molecule structure. As non-limiting examples, there can be mentioned methane, ethane, propane, ethylene, propylene, butadiene, benzene, xylenes, toluenes, chloroform, dichloromethane, trichloromethane, carbon tetrachloride, methyl bromide, 1,2-dichloroethane, vinyl chloride, monochlorobenzene, chloro-fluoro-carbons, PCBs and dioxines. Amongst halogen-containing organic compounds and/or organic compounds showing a vapor pressure of 0.01 kPa or higher at a temperature of 293.15° K and/or hydrocarbons containing two carbon atoms and/or $C_2$ chlorinated hydrocarbons can be effectively treated in accordance with the invention.

The "halogen" as used herein includes fluorine, chlorine, bromine and iodine. The expression "organic compounds showing a vapor pressure of 0.01 kPa or higher at a temperature of 293.15°K is a measure for defining volatile organic compounds including, for example, methane, ethane, propane, ethylene, propylene, butadiene, benzene, xylenes, toluenes, chloroform, dichloromethane, trichloromethane, carbon tetrachloride, methyl bromide, 1,2-dichloroethane, vinyl chloride, monochlorobenzene and chloro-fluor-carbons.

It is preferred that organic compounds are present in a concentration of not greater than about 1% by volume in a gas stream to be treated for combustion of the organic compounds according to the process of the invention.

Though the process conditions, such as space velocity and temperature, are not restricted to any specific ranges thereof, a preferred range of the space velocity is from about 100 to 500,000 $hr^{-1}$ and a preferred range of the operation temperature is from about 100 to 700° C.

When a gas stream containing organic compounds is subjected to the present combustion process, the raw gas stream may contain other substances such as water, oxygen, hydrogen, hydrogen chloride, nitrogen oxides, sulfur oxides and fine particulate objects.

Now the invention will be specifically described by the following working examples that by no means limit the scope of the invention.

EXAMPLE 1

Preparation of Catalyst 1

An alumina material (commercially available from Sumitomo Chem. Co., Ltd. under the trademark "TA-1301") in an amount of 20 g was added into 180 ml of a 28.5 mM aqueous solution of dinitro-dianimine platinum. The resulting mixture was stirred under at 30° C. for 2 hours and then separated into solid-liquid phases. The solid phase was washed with pure water and dried at 110° C. for 20 hours to give a platinum-loaded alumina. By ICP emission spectroscopy, a platinum content of 4.3% by weight was found, but no rare earth elements were detected. By nitrogen adsorption method, it was determined that the alumina had such a pore size distribution that, where "a" represented a pore radius in Å at the maximum of the pore size distribution curve, the accumulated pore volume of pores having radii in the range of (a−25) Å to (a+25) Å was 90% of the total volume of all the pores. The platinum-loaded alumina was used as a first catalyst.

A beta type zeolite having a $SiO_2/Al_2O_3$ molar ratio of 25.7 (commercially available from Tosoh Corporation under the trademark "HSZ-930-HOA") 50 g was introduced into 450 ml of a 0.69 M aqueous calcium acetate solution. The resulting mixture was stirred at 60° C. for 20 hours to effect ion-exchanging. The slurry was separated into solid and liquid phases and the resulting zeolite cake was added into 450 ml of a 0.69 M aqueous calcium chloride solution to effect again ion-exchanging with stirring at 60° C. for 20 hours. After solid-liquid separation, the solid cake was washed repeatedly with pure water until no chloride ion was detected in the filtrate. Then the solid was dried at 110° C. for 20 hours to give a calcium-form beta.

An 8 g portion of the thus-obtained calcium-form beta and a 2 g portion of the previously obtained platinum-loaded alumina were combined and mixed thoroughly to give a second catalyst.

Each of the first catalyst and the second catalyst was pelletized, crushed, and graded Into 12 to 20 mesh. A 1 ml (0.75 g) sample of particles in such a size range of the first catalyst and a 1 ml (0.5 g) sample of particles in such as size range of the second catalyst were packed in an upstream part and a downstream part, respectively, of an atmospheric-pressure fixed bed reactor to give a "Catalyst 1".

EXAMPLE 2

Preparation of Catalyst 2

An alumina material (commercially available from Sumitomo Chemical Co., Ltd. under the trademark "TA-1301") in an amount of 20 g was added Into 180 ml of a 5.70 mM aqueous solution of dinitro-diammine platinum. The resulting mixture was stirred at 30° C. for 2 hours and then separated into solid-liquid phases. The solid phase was washed with pure water and dried at 110° C. for 20 hours to give a platinum-loaded alumina. By ICP emission spectroscopy, a platinum content of 1.0% by weight was found, but no rare earth elements were detected. By nitrogen adsorption method, it was determined that the alumina had such a pore size distribution that, where "a" represented a pore radius in Å at the maximum of the pore size distribution curve, the accumulated pore volume of pores having radii in the range of (a−25) Å to (a+25) Å was 90% of the total volume of all the pores. The platinum-loaded alumina was used as a first catalyst.

A portion of a second catalyst as prepared in EXAMPLE 1 was used as a second catalyst.

Each of the first catalyst and the second catalyst was pelletized, crushed, and graded into 12 to 20 mesh. A 1 ml (0.75 g) sample of particles in such a size range of the first catalyst and a 1 ml (0.5 g) sample of particles in such as size range of the second catalyst were packed in an upstream part and a downstream part, respectively, of an atmospheric-pressure fixed bed reactor to give a "Catalyst 2".

COMPARATIVE EXAMPLE 1

Preparation of Comparative Catalyst 1

A portion of the platinum-loaded alumina as prepared in EXAMPLE 1 was pelletized, crushed and graded into 12 to 20 mesh and a 2 ml sample of particles in such a size range was packed in an atmospheric-pressure fixed bed reactor to give a "Comparative Catalyst 1".

COMPARATIVE EXAMPLE 2

Preparation of Comparative Catalyst 2

A 8 g portion of the calcium-form beta as prepared in EXAMPLE 1 and a 2 g portion of the platinum-loaded alumina as prepared in EXAMPLE 1 were combined and mixed. The mixture was pelletized, crushed and graded into 12 to 20 mesh and a 2 ml sample of particles in such a size range was packed in an atmospheric-pressure fixed bed reactor to give a "Comparative Catalyst 2".

COMPARATIVE EXAMPLE 3

Preparation of Comparative Catalyst 3

A 1 ml (0.5 g) portion of second catalyst as prepared in EXAMPLE 1 and a 1 ml (0.75 g) portion of first catalyst as prepared in EXAMPLE 1 were packed in an upstream part and a downstream part, respectively, of an atmospheric-pressure fixed bed reactor to give a "Comparative Catalyst 3".

Catalyst Performance Evaluation

Each of Catalysts 1 and 2 prepared in EXAMPLES 1 and 2 and Comparative Catalysts 1–3 prepared in COMPARATIVE EXAMPLES 1–3 was pretreated by passing through the catalyst an air stream at 500° C. for 1 hour. After the pretreatment, the bed was cooled down to a temperature of 100° C., and a gas having a composition as set forth in Table 1 was passed through the bed at a flow rate of 360 ml/min. while raising the temperature at a rate of 10° C. per minute.

TABLE 1

| Gas Composition (by volume) | |
|---|---|
| 1,2-Dichloroethane | 2,000 ppm |
| Ethylene | 6,000 ppm |
| $O_2$ | 11.1% |
| $H_2O$ | 0.3% |
| $N_2$ | Balance |

Temperatures at which conversions of the total hydrocarbons in the bed gas stream reached 95% and 99% were determined. Table 2 shows the temperatures at which 95% and 99% of the total hydrocarbon conversions were observed.

TABLE 2

| | Conversion attained at Temperature | |
|---|---|---|
| | Conversion attained at Temperature (° C.) | |
| Catalyst | Conversion 95% | Conversion 99% |
| Catalyst 1 | 196 | 235 |
| Catalyst 2 | 235 | 272 |
| Comparative Catalyst 1 | 318 | 395 |
| Comparative Catalyst 2 | 300 | 314 |
| Comparative Catalyst 3 | 471 | 482 |

As seen from the results shown in Table 2, use of the catalyst of the invention in which a first catalyst comprising a metal oxide containing at least one of the elements of the platinum group, and a second catalyst comprising a mixture of zeolite with a metal oxide containing at least one of the elements of the platinum group enables the removal of organic compounds contained in a gas stream by catalytic combustion of them at a lower temperature and more efficiently than could be performed by the prior art. The invention is expected to be very useful in maintaining a clean environment.

What is claimed is:

1. A combustion catalyst for removing organic compound (s), which comprises a first catalyst comprising alumina containing at least one of the elements of the platinum group, and a second catalyst comprising a mixture of zeolite with a metal oxide, wherein the metal oxide is loaded with at least one of the elements of the platinum group;
   the alumina of the first catalyst has a pore size distribution such that where "a" represents a pore radius in Å at the maximum of the pore radius distribution curve, the accumulated pore volume of pores having radii in the range of (a−25) Å to (a+25) Å is at least 65% of the total volume of all the pores, said alumina containing less than 1% by weight of rare earth elements: and wherein
   said first catalyst and said second catalyst are not mixed together and are arranged in a manner such that organic compound(s) to be removed is/are contacted first with the first catalyst and then with the second catalyst.

2. The combustion catalyst according to claim 1, wherein the ratio of the first catalyst to the second catalyst is in the range from 1:20 to 2:1 by weight.

3. The combustion catalyst according to claim 1, wherein the ratio of zeolite to the metal oxide loaded with at least one of the elements of the platinum group in the mixture of the second catalyst is in the range from 20:1 to 1:20 by weight.

4. The combustion catalyst according to claim 1, wherein the zeolite is ion-exchanged with at least one ionic species selected from the group consisting of those of the groups IA and IIA.

5. The combustion catalyst according to claim 1, wherein the metal oxide in the second catalyst is alumina having pore size distribution such that, where "a" represents a pore radius in Å at the maximum of the pore radius distribution curve, the accumulated pore volume of pores having radii in the range of (a−25) Å to (a+25) Å is at least 65% of the total volume of all the pores, said alumina containing less than 1% by weight of rare earth elements.

6. The combustion catalyst according to claim 1, wherein the zeolite has an $SiO_2/Al_2O_3$ molar ratio of 10 or greater.

7. The combustion catalyst according to claim 1, wherein the zeolite is ion-exchanged with calcium ion.

8. The combustion catalyst according to claim 1, wherein the alumina and the metal oxide contain platinum.

9. The combustion catalyst according to claim 1, wherein the organic compound(s) is/are hydrocarbon(s) which is/are unsubstituted or substituted by at least one of halogen and oxygen.

10. A process for removing organic compound(s) by catalytic combustion comprising the step of contacting organic compound(s) with the combustion catalyst as claimed in claim 1, so that the organic compound(s) is/are contacted first with the first catalyst of the combustion catalyst and then with the second catalyst of the combustion catalyst.

11. The process according to claim 10, wherein the ratio of the first catalyst to the second catalyst is in the range from 1:20 to 2:1 by weight.

12. The process according to claim 10, wherein the ratio of the zeolite to the metal oxide loaded with at least one of the elements of the platinum group in the mixture of the second catalyst is in the range from 20:1 to 1:20 by weight.

13. The process according to claim 10, wherein the zeolite is ion-exchanged with at least one ionic species selected from the group consisting of those of groups IA and IIA.

14. The process according to claim 10, wherein the metal oxide in the second catalyst is alumina having a pore size distribution such that, wherein "a" represents a pore radius in Å at the maximum of the pore radius distribution curve, the accumulated pore volume of pores having radii in the range of (a−25) Å to (a+25) Å is at least 65% of the total volume of all the pores, said alumina containing less than 1% by weight of rare earth elements.

15. The process according to claim 10, wherein the organic compound(s) comprise(s) at least one halogen-containing organic compound.

16. The process according to claim 10, wherein the organic compound(s) show(s) a vapor pressure of 0.001 kPa or higher at a temperature of 293.15° K.

17. The process according to claim 10, wherein a gas containing the organic compound(s) is/are contacted with the combustion catalyst, the organic compound(s) being present in a concentration of not greater than 1% by volume in said gas.

18. The process according to claim 10, wherein the organic compound(s) comprise(s) at least one $C_2$ hydrocarbon.

19. The process according to claim 10, wherein the organic compound(s) comprise(s) at least one chlorinated $C_2$ hydrocarbon.

20. The process according to claim 10, wherein the zeolite has an $SiO_2/Al_2O_3$ molar ratio of 10 or greater.

21. The process according to claim 10, wherein the zeolite is ion-exchanged with calcium ion.

22. The process according to claim 10, wherein the alumina and the metal oxide contain platinum.

23. The process according to claim 10, wherein the organic compound(s) is/are hydrocarbon(s) which is/are unsubstituted or substituted by at least one of halogen and oxygen.

* * * * *